US010857896B2

(12) United States Patent
Bridges

(10) Patent No.: US 10,857,896 B2
(45) Date of Patent: Dec. 8, 2020

(54) ROADWAY TRANSPORTATION SYSTEM

(71) Applicant: Samuel Rutt Bridges, Greenwood Village, CO (US)

(72) Inventor: Samuel Rutt Bridges, Greenwood Village, CO (US)

(*) Notice: Subject to any disclaimer, the term of this patent is extended or adjusted under 35 U.S.C. 154(b) by 298 days.

(21) Appl. No.: 16/005,497

(22) Filed: Jun. 11, 2018

(65) Prior Publication Data

US 2018/0364738 A1 Dec. 20, 2018

Related U.S. Application Data

(60) Provisional application No. 62/519,694, filed on Jun. 14, 2017.

(51) Int. Cl.
*B60L 53/14* (2019.01)
*G05D 1/02* (2020.01)
(Continued)

(52) U.S. Cl.
CPC .............. *B60L 53/14* (2019.02); *B60D 1/62* (2013.01); *B60L 53/80* (2019.02); *G05D 1/0217* (2013.01);
(Continued)

(58) Field of Classification Search
CPC .. G05D 1/0287; G05D 1/0217; G05D 1/0088; B60L 53/14; B60L 53/80; B60L 2200/28; B60D 1/62; G08G 1/20
See application file for complete search history.

(56) References Cited

U.S. PATENT DOCUMENTS 5,343,812 A 9/1994 Ishida
8,170,756 B2 5/2012 Morey et al.
(Continued)

FOREIGN PATENT DOCUMENTS

CN 202378874 8/2012
DE 102012020617 8/2012
(Continued)

OTHER PUBLICATIONS

"Clean Cities Alternative Fuel Price Report," U.S. Department of Energy, Jul. 2013, 17 pages.
(Continued)

*Primary Examiner* — Calvin Cheung
(74) *Attorney, Agent, or Firm* — Sheridan Ross P.C.

(57) ABSTRACT

A reversible, driverless, fully electric or plug-in hybrid tractor-trailer includes a trailer equipped with autonomous reversible self-propulsion and steering equipment and configured to dock with one or two tractors in a pulling and/or pushing configuration. The tractor(s) are equipped for autonomous navigation. Replacement tractors can autonomously navigate from a charging and/or refueling facility to the tractor-trailer and can further autonomously execute a swap-out procedure by which spent tractor(s) are replaced by the freshly charged tractor(s). The replaced tractor(s) then autonomously navigate back to the charging and/or refueling facility, while the tractor-trailer continues, nonstop, toward its destination. Where allowed by law, combination multi-trailer road-train vehicles can be formed by connecting trailers to trailers and also possibly inserting a tractor between trailers that are attached to both ends of the inserted tractor.

20 Claims, 8 Drawing Sheets

(51) Int. Cl.
*B60D 1/62* (2006.01)
*B60L 53/80* (2019.01)
*G08G 1/00* (2006.01)
*G05D 1/00* (2006.01)

(52) U.S. Cl.
CPC ............ *G05D 1/0287* (2013.01); *G08G 1/20* (2013.01); *B60L 2200/28* (2013.01); *G05D 1/0088* (2013.01)

(56) References Cited

U.S. PATENT DOCUMENTS

| | | | | |
|---|---|---|---|---|
| 8,365,674 | B2* | 2/2013 | Banwart | B61D 47/005 105/3 |
| 8,534,694 | B2* | 9/2013 | Banwart | B61D 3/187 280/476.1 |
| 8,789,472 | B2 | 7/2014 | Mai | |
| 10,663,968 | B2* | 5/2020 | Mere | H04W 4/40 |
| 2007/0194557 | A1* | 8/2007 | Caporali | B60D 1/242 280/493 |
| 2016/0054735 | A1* | 2/2016 | Switkes | H04W 4/44 701/23 |
| 2018/0052463 | A1* | 2/2018 | Mays | B60K 28/14 |
| 2018/0057052 | A1* | 3/2018 | Dodd | G01D 5/16 |
| 2018/0297615 | A1* | 10/2018 | Banwart | B61D 47/005 |
| 2018/0308365 | A1* | 10/2018 | Liu | G08G 1/22 |
| 2018/0313282 | A1* | 11/2018 | Pati | G05D 1/0293 |
| 2018/0372875 | A1* | 12/2018 | Juelsgaard | G01S 17/86 |
| 2019/0039425 | A1* | 2/2019 | Dodd | B60W 10/06 |
| 2019/0056736 | A1* | 2/2019 | Wood | G05D 1/0246 |
| 2019/0064828 | A1* | 2/2019 | Meredith | G05D 1/0242 |
| 2019/0064835 | A1* | 2/2019 | Hoofard | B60D 1/245 |
| 2019/0129429 | A1* | 5/2019 | Juelsgaard | G01S 17/00 |
| 2019/0235504 | A1* | 8/2019 | Carter | G05D 1/0257 |
| 2019/0283766 | A1* | 9/2019 | Jensen | B60W 40/107 |
| 2019/0367107 | A1* | 12/2019 | Grossman | B60S 9/02 |
| 2019/0385461 | A1* | 12/2019 | Blomstrand | G08G 1/22 |

FOREIGN PATENT DOCUMENTS

| | | |
|---|---|---|
| EP | 1955917 | 8/2008 |
| EP | 2179905 | 4/2010 |
| EP | 2539205 | 12/2013 |
| EP | 2882065 | 6/2015 |
| FR | 2954927 | 7/2011 |
| WO | WO 2011/161471 | 12/2011 |

OTHER PUBLICATIONS

"Interstate Truck Driver's Guide to Hours of Service," Federal Motor Carrier Safety Administration, Oct. 2016, 28 pages.

"Trucking industry in the United States," Wikipedia, accessed Aug. 5, 2020, 12 pages.

Bedell, "Electrification of Long Haul Trucks using Tractor Swapping (Pony Express Model)," Furrer + Frey, Date Unknown, 24 pages.

Edelstein et al., "How to turn long-haul trucking all-electric? Tractor swapping!," Green Car Reports, Jun. 12, 2016, retrieved from https://www.greencarreports.com/news/1104425_how-to-turn-long-haul-trucking-all-electric-tractor-swapping, 8 pages.

Shantz et al., "Heavy hauling oversize load two tractors one pulling one pushing parked Arizona," Alamy Stock Photo, Nov. 18, 2009, retrieved from https://www.alamy.com/stock-photo-heavy-hauling-oversize-load-two-tractors-one-pulling-one-pushing-parked-26836973.html, 1 page.

Torchinsky et al., "Tesla's Plan to Build a Semi Truck is the Smartest Idea They've Had," Jalopnik, Jul. 21, 2016, retrieved from https://jalopnik.com/teslas-plan-to-build-a-semi-truck-is-the-smartest-idea-1784065871, 9 pages.

\* cited by examiner

| Costs per Mile | 2012 | Percent | Comment |
|---|---|---|---|
| *Vehicle-based* | | | |
| Fuel & Oil Costs | $0.598 | 39.58% | Costs adjusted to reported $1.51 per mile |
| Lease or Purchase Payments | $0.162 | 10.74% | Costs adjusted to reported $1.51 per mile |
| Repair & Maintenance | $0.114 | 7.55% | Costs are specific to Truckload (TL) carriers |
| Truck Insurance Premiums | $0.060 | 3.97% | Costs are specific to Truckload (TL) carriers |
| Permits and Licenses | $0.020 | 1.32% | Costs are specific to Truckload (TL) carriers |
| Tires | $0.044 | 2.91% | Costs are specific to Truckload (TL) carriers |
| Tolls | $0.019 | 1.26% | Costs are specific to Truckload (TL) carriers |
| Subtotal, Vehicle Costs | $1.017 | 67.34% | |
| *Driver-based* | | | |
| Driver Wages | $0.385 | 25.50% | Costs are specific to Truckload (TL) carriers |
| Driver Benefits | $0.108 | 7.16% | Costs adjusted to reported $1.51 per mile |
| Subtotal, Driver Costs | $0.493 | 32.66% | |
| Total | $1.510 | 100.00% | |
| Total: Fuel+Oil+Driver | $1.091 | 72.24% | |

*Fig. 9*
(Prior Art)

| Costs per Mile | 2012 dollars | Percent | Comment |
|---|---|---|---|
| *Vehicle-based* | | | |
| Fuel & Oil Costs | $0.157 | 31.78% | Cost greatly reduced via LNG Stations |
| Lease or Purchase Payments | $0.081 | 16.35% | Costs cut in half due to 3.58x greater miles/truck |
| Repair & Maintenance | $0.114 | 23.01% | 2012 Truckload (TL) carriers reported cost |
| Truck Insurance Premiums | $0.060 | 12.11% | Probably lower, but unchanged |
| Permits and Licenses | $0.020 | 4.04% | 2012 Truckload (TL) carriers reported cost |
| Tires | $0.044 | 8.88% | 2012 Truckload (TL) carriers reported cost |
| Tolls | $0.019 | 3.83% | 2012 Truckload (TL) carriers reported cost |
| Subtotal, Vehicle Costs | $0.495 | 100.00% | |
| *Driver-based* | | | |
| Driver Wages | $0.000 | 0.00% | Autonomous Vehicle, no Driver |
| Driver Benefits | $0.000 | 0.00% | Autonomous Vehicle, no Driver |
| Subtotal, Driver Costs | $0.000 | 0.00% | |
| Total | $0.495 | 100.00% | |

*Fig. 10*

ROADWAY TRANSPORTATION SYSTEM

CROSS-REFERENCE TO RELATED APPLICATIONS

Pursuant to at least 35 U.S.C. § 119(e), this application claims the benefit of U.S. Provisional Patent Application No. 62/519,694, filed on Jun. 14, 2017 and entitled "Roadway Transportation System," which is hereby incorporated by reference herein in its entirety and for all purposes.

FIELD

The present disclosure is directed to systems for transporting people or goods, and more particularly to a roadway transportation system that utilizes environmentally friendly energy sources and autonomous navigation.

BACKGROUND

The trucking industry is a major part of America's economy. Trucks move about 60% by weight and 70% by value of all U.S. goods. According to the Journal of Commerce website (JOC.com), the top 50 private firms (as ranked in 2012) grossed $101 billion in 2012, with the top four (UPS, FedEx, JB Hunt and YRC) representing $51 billion of revenues. However, this does not include trucking integrated within companies. In total, trucking was a $544 billion industry in 2009.

The American Transportation Research Institute (ATRI) annually surveys the trucking industry and provides detailed data (98% tractor-trailer based) on costs, use statistics and trends. FIG. 9 is a summary of the average carrier cost per mile including data specific to trucks hauling full loads.

According to the survey responses, in 2012, driver wages and benefits represented 32.66% of costs, and fuel and oil represented 39.58%.

Various technologies are emerging from projects such as Peleton Technology's truck platooning (in which vehicle to vehicle communication is used to connect the braking and acceleration between two trucks, so that a lead truck can control the acceleration and braking of both trucks virtually simultaneously and allows the trucks to drive closer to each other than would otherwise be possible, resulting in significant fuel savings due to aerodynamic benefits), Mercedes Benz's Level 3 autonomous trucks (which have limited autonomous driving capability), Google's Level 4 autonomous cars (which have a greater autonomous driving capability), and Peterbilt/Cummins' "Super Truck" (a tractor-trailer that features aerodynamic improvements, advanced and lightweight materials, and friction minimization advances to improve efficiency).

The following documents are incorporated by reference into the present disclosure in their entirety: French Patent Application No. 2 954 927, entitled "Railway Driving And Transporting Assembly For Use In i.e. Ore Transporting Train, Has Complementary Modules Mounted On Base Module In Removable Manner And Equipped With Control Module, Safety Module And Nominal Power Module"; "Pony Express" Electrification of Long Haul Trucks Using Tractor Swapping, by Roger Bedell; U.S. Pat. No. 8,170,756, entitled "Excavating System Utilizing Machine-to-Machine Communication"; Chinese Patent No. CN202378874U, entitled "Vehicle Grounding System of High-Speed Motor Train Unit"; European Patent No. EP1955917B1, entitled "Railcar Vehicle for Passenger Transport"; European Patent No. EP2539205B1, entitled "Transport System with Tractors"; U.S. Pat. No. 8,789,472, entitled "Quasi Self-Contained Energy Storage and Power Supply System"; European Patent No. EP2179905B1, entitled "Passenger Transport Railcar"; PCT Application No. PCT/GB2011/051201, entitled "Improved Farming System"; U.S. Pat. No. 5,343,812A, entitled "Train of Articulated Vehicles"; European Patent Application No. EP2882065A1, entitled "Charging Management System for Unpiloted Conveyance Vehicle and Charging Management Method"; and German Patent Application No. DE102012020617A1, entitled "Method for Operating Fleet of Industrial Trucks, Involves Indicating Usage Data, In Which Ratio of Transmitted Operating Modes of Truck to Transmitted Operating Modes of Entire Fleet And/Or To Remaining Operating Time of Trucks Is Provided."

SUMMARY

The foregoing information illustrates the potential for dramatic cost reduction in Fuel+Oil+Driver costs which together represent 72.24% of total trucking costs. A system that dramatically reduces these costs while increasing average vehicle speed and total miles traveled per year would qualify as a disruptive innovation in the long-haul trucking industry.

The present disclosure describes a network of self-driving, autonomous tractor-trailers (semis) that run on liquefied natural gas (LNG) or electricity and operate twenty-four hours a day, seven days a week, primarily on U.S. Interstate highways. In at least some embodiments, the system may use existing vehicles, LNG stations and drivers/monitors. The system contemplates a five-mile per LNG gallon 80,000-pound gross vehicle weight semi tractor-trailer with a 500-gallon (1,765-pound fuel weight) LNG tank and a range of 2,500 miles between refueling stops or operations (since driver rest stops aren't needed). This extended range would significantly lower operating costs.

The present disclosure describes trucks and other vehicles that achieve improved range and lower operating costs in part from the use of one more technologies (including those described above from Peloton Technology, Mercedes Benz, Google, and Peterbilt/Cummins) already in development, in part from the use of real-time routing updates from Waze and other tools to identify the most efficient routes of travel, in part from weight savings resulting from eliminating the cab/sleeper and making related modifications (which can result in a savings of approximately 3,000 pounds), and in part from the other features described herein.

The present disclosure also describes one or more products, including Reversible Electric Driverless Battery Pack Tractors ("REDBPTs") and specially-designed long-haul freight trailers ("Trailers"), and a process using REDBPTs and Trailers through which freight is more efficiently transported at a much lower cost. One REDBPT couples itself to a Trailer front to pull the Trailer, while another REDBPT may couple to the Trailer back to push the Trailer. Like tractors currently used in tractor-trailer combinations, each REDBPT is capable of independent travel, but is designed to operate together with one or more Trailers and/or one or more other REDBPTs to manage the safe and efficient movement of Trailers. The Trailers may be reversible with identical docking ports on each end through which push/pull REDBPTs could couple and uncouple.

A rig according to one embodiment of the present disclosure comprises at least one tractor and at least one trailer. The at least one tractor comprises a first autonomous driving system comprising a first processor and a first plurality of sensors, the first autonomous driving system configured to steer the at least one tractor autonomously; a first energy source; at least one tractor motor powered by the first energy source; and a first docking port comprising a first communication link. The at least one trailer comprises a second autonomous driving system comprising a second processor and a second plurality of sensors, the second autonomous driving system configured to steer the at least one trailer autonomously; a freight container; a second energy source; at least one trailer motor; a plurality of powered, steerable wheels; and a second docking port detachably secured to the first docking port, the second docking port comprising a second communication link detachably secured to the first communication link.

The first energy source may be a first battery, the second energy source may be a second battery, the at least one tractor motor may be an electric motor, and the at least one trailer motor may be an electric motor. The first battery may have a greater capacity than the second battery. The at least one tractor motor may have substantially equal capabilities when operated in forward and reverse. The first autonomous driving system may further comprise a first wireless transceiver. The first autonomous driving system may receive information about at least one of traffic and road conditions via the first wireless transceiver. The first autonomous driving system may control at least one of acceleration, braking, and steering of the at least one trailer via the communication link or the first wireless transceiver. The at least one trailer may comprise a regenerative braking system. The second plurality of sensors may comprise a radar, a LiDAR, or a camera. The at least one tractor may be docked to a rear end of the at least one trailer and may be further configured to push the at least one trailer.

A tractor-trailer system according to another embodiment of the present disclosure comprises a trailer and a tractor. The trailer comprises at least one trailer coupling and a storage volume. The tractor comprises a plurality of wheels; an electric motor operably connected to the plurality of wheels so as to selectively drive the wheels; a tractor coupling detachably secured to the at least one trailer coupling; and an autonomous navigation system comprising a first plurality of sensors, a processor, and a memory. The memory stores instructions for execution by the processor. The instructions, when executed by the processor, cause the processor to selectively detach the tractor coupling from the at least one trailer coupling while the tractor and trailer are in motion.

The selective detachment of the tractor coupling from the at least one trailer coupling may occur while the tractor and trailer are traveling between 5 miles per hour and 85 miles per hour. The storage volume may comprise a plurality of passenger seats and a lavatory. The trailer may further comprise: a plurality of powered, steerable wheels; a second plurality of sensors; and a processing unit capable of autonomously controlling operation of the powered, steerable wheels, based in part on information from the second plurality of sensors. The powered, steerable wheels may be powered by at least one electric motor. The tractor may further comprise a tractor battery. The trailer may further comprise a trailer battery, and the storage capacity of the tractor battery may be at least five times greater than the storage capacity of the trailer battery. The tractor-trailer system may further comprise a second tractor comprising a second tractor coupling, and the trailer may further comprise at least a second trailer coupling detachably secured to the second tractor coupling. The memory may store additional instructions for execution by the processor that, when executed by the processor, cause the processor to selectively cause the tractor coupling to attach to the at least one trailer coupling while the tractor and trailer are in motion.

A long-haul transport system according to still another embodiment of the present disclosure comprises a trailer and a plurality of autonomous tractors. The trailer comprises an enclosure for holding passengers or cargo; a trailer docking port; a plurality of sensors; a processing unit capable of autonomously driving the trailer, based in part on information received from the plurality of sensors; and a plurality of powered, steerable wheels controlled by the processing unit. Each of the plurality of autonomous tractors comprises: a tractor docking port removably attachable to the trailer docking port; an autonomous driving system; a second plurality of sensors configured to provide sensed information to the autonomous driving system; a replaceable battery; and at least one electric motor powered by the replaceable battery, the at least one electric motor drivingly connected to a plurality of wheels. Each of the plurality of autonomous tractors, under the control of the autonomous driving system, sequentially docks with the trailer via the tractor docking port and the trailer docking port while the trailer is in motion; remains docked with the trailer until reaching a predetermined battery level or geographical location; and undocks from the trailer while the trailer is in motion.

The terms "memory," "computer-readable medium" and "computer-readable memory" are used interchangeably and, as used herein, refer to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable medium is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

FIG. 9 is a table summarizing data from the American Transportation Research Institute showing average carrier cost per mile for trucks hauling full loads;

FIG. 10 is a table summarizing the estimated per-mile costs (in 2012 dollars) for a long-haul truck that implements the features of one embodiment of the present disclosure.

DETAILED DESCRIPTION

Figure 1:
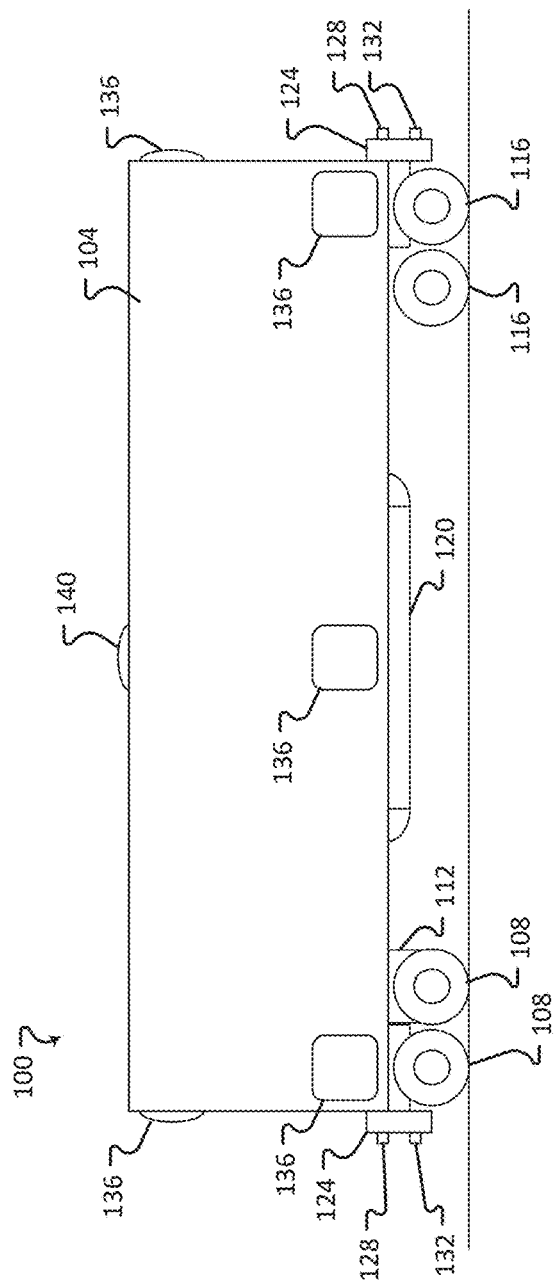
FIG. 1 shows a Trailer according to at least one embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

There are reasons other than simply the current cost of drivers' wages and benefits to consider a switch to autonomous vehicles. Due to human fatigue, federal law limits the number of hours drivers can operate trucks to 11 continuous hours within a maximum 14-hour work day, after which they are required to take a mandatory rest period of 10 hours. In any seven-day period, the driver can be on duty (not necessarily just driving) a maximum of 60 hours, or 70 hours in an 8-day period. After one of these 7- or 8-day periods drivers must be off work for 34 hours. Obviously, these limits wouldn't apply to autonomous vehicles.

Other than the need for picking up and dropping off trailers, refueling and truck maintenance, there is no clear reason why an autonomous truck could not operate on a 24/7 schedule. Based on ATRI survey responses, truck-tractors were driven an average of 102,848 miles per year, with only about a quarter of companies using 'team drivers'. They also validated with survey respondents an average overall truck speed of 40 mph. Given that theoretically there are 8760 hours in a year, this implies a potential 350,000 miles per year per vehicle, for an average truck utilization rate of 29%. While there are always reasons why vehicles are not fully employed, it would seem reasonable to expect that autonomous vehicles with a 2,500 mile range and no need for rest stops could achieve double these utilization rates, representing a much higher return on invested capital.

There are a few other advantages to autonomous trucks:

Improved safety: Long-haul driving mostly on interstates is much less risky than conventional urban and suburban highways. Fortunately, computers, cameras, radar and sensors don't get sleepy or distracted on long boring drives.

Avoiding highway delays: By using technology similar to the Waze app's real-time routing updates, a centrally managed fleet of trucks could capitalize on a social network-derived database of up-to-the-minute information on travel delays due to accidents, construction, sports events, and any other of the unpredictable 'adventures' of highway travel.

Reduced traffic congestion: A far larger percentage of long-haul freight travel would be shifted to the early morning hours when few drivers are on the road. This would increase the utilization of our transportation infrastructure while improving shipping times, safety and fuel efficiency.

The human drivers will appreciate the reduction in rush-hour congestion. The trucking companies would benefit from a higher average truck speed, perhaps approaching 60 mph compared to the current average of 40 mph, which would increase the productivity of these fixed assets. It might also be worth considering restricting freight travel during urban rush hours.

Reduced shipping time: With a non-stop range of 2,500 miles and no restriction on driver hours, shipping times could be slashed, creating a significant competitive advantage. A 2,000 mile LA to Chicago trip might take as few as 33 hours, and San Francisco to New York City, 48 hours. For many routes there would be obvious cost and logistical advantages over airfreight.

Although these advantages are real, there are also two major disadvantages:

Loss of jobs for truck drivers: About 1.5 million Americans are employed as drivers in the trucking industry. While a transition to autonomous trucks will be a gradual process, many good-paying jobs will be lost forever. Responsible companies who adopt autonomous technology should create a plan for transitioning drivers into other opportunities within their company, or if that is not possible, offer generous job training benefits to help with this transition.

Lack of a human onboard if a problem arises: There may be a telephone number, website, and scannable QR code prominently displayed on the exterior of the truck (REDBPT and/or Trailer) to easily contact company dispatchers in the event of an accident or other problem.

The present disclosure contemplates the use of liquified natural gas (LNG) as one potential fuel for use in the transportation system disclosed herein, whether as the sole fuel or as one of a plurality of energy sources (e.g. in a hybrid vehicle). There is already growing use of LNG by some of the more progressive trucking companies, and LNG vehicles are now offered by most major long haul tractor manufacturers. The largest carrier, UPS, has announced a plan to add new LNG long-haul trucks and additional LNG fueling stations. LNG is reported to provide fuel savings over diesel of about 30%. Based on July 2013 prices, Westport Innovations claims 39% lower fuel costs based on U.S. average retail diesel and natural gas prices. However, there is a very substantial markup in retail station LNG prices versus raw natural gas prices, which in July 2013 averaged about $3.62 per million Btu versus about $30 per million Btu for diesel. Much of this difference comes from the 'retail' utility prices paid by stations for natural gas, plus small quantity fueling station liquefaction costs.

An alternative strategy is to build far fewer 'proprietary' fueling stations at key locations throughout the U.S. based on trucks with a far greater range, in this case 2,500 miles. This extended range can be a game-changer. These stations could produce far higher volumes of LNG at much lower liquefaction costs and could also employ custom-designed equipment for faster refueling. And instead of buying natural gas from local utilities, gas could be purchased directly from producers (as is done by chemical manufacturers) tapping into the existing national network of pipelines. In 2010 manufacturers paid an average of $4.83 per million Btu, a premium of 10% over the raw producer's (Henry Hub') average spot price of $4.39. While a very large industrial plant's liquefaction costs may be in the $0.90-1.30 per million Btu range, more modest-sized facilities needed for large refueling facilities might cost $2-3 per million Btu. For present purposes, a cost of $3 per million Btu for liquefaction is assumed, plus $5 per million Btu for the natural gas to be liquefied, for a total of $8 per million Btu for LNG.

Even at those costs, given a current average diesel price of $3.91 per gallon, or $30.36 per million Btu, fuel costs per mile would be about a quarter of the reported $0.598 per mile for diesel-powered trucks, or $0.158 per mile—a reduction of 74%.

Other advantages to using LNG as a fuel are described below.

Stable and reliable fuel supply: Unlike petroleum, U.S. natural gas is abundant with sufficient proved U.S. reserves for about one hundred years. In fact, due to shale gas development U.S. reserves have almost doubled in the last ten years. Since the U.S. is a net exporter of natural gas, unlike diesel this supply is immune to global political instability.

Less fuel price sensitivity: Even if delivered natural gas prices doubled to $10 per million Btu, which is unlikely given the vast U.S. reserves, LNG would still cost only 43% as much as diesel.

Far quieter: Heavy-duty natural gas vehicles have an 80-90% lower decibel level than comparable diesels.

Far lower emissions: Natural gas produces less than a tenth as much nitrous oxide, 73% less particulate matter (soot), 23% less greenhouse gas and less than half the volatile organic compounds compared to diesel fuel. Unlike diesel, natural gas engines do not require active aftertreatment and only require passive emissions controls, which lowers maintenance costs.

Biomethane: By using biomethane produced from landfill gas or food and animal waste, there is a net savings compared to allowing the methane to escape into the atmosphere. The same is true for the use of methane escaping from abandoned coal mines. Since raw methane is 20 or more times as potent a greenhouse gas as $CO_2$, there is a huge net reduction in greenhouse gas emissions.

There are other components of a motor carrier's cost per mile that can be reduced based on the systems and methods of the present disclosure. Assuming that autonomous trucks can achieve an average speed of 60 mph, and that they can be managed so that they are on the road 70% of the time, an autonomous truck could potentially average 367,920 miles per year (0.70 utilization rate*24 hours per day*365 days per year*60 miles per hour), more than triple the ATRI reported average per truck of 102,848 miles. While the costs per mile of Repairs & Maintenance, Tires, Tolls and Permits & Licenses would not change, the increased productivity would have a direct impact on the cost per mile of Lease or Purchase Payments. Assuming a shorter (in years) total vehicle life, but a faster recapture of capital investment, it may be reasonable to reduce the per mile cost of Lease or Purchase Payments by half.

It would also seem reasonable that Insurance costs per mile would be lower based on 1) the absence of a driver who is at risk in an accident, 2) the constant monitoring of potential mechanical failures by an array of computerized sensors, 3) the saved documentation of a full 360 degree, 3D model of the accident site by the autonomous truck's extensive camera, radar and LiDAR sensors, and 4) the anticipated improved safety record of autonomous vehicles whose focus and attention never wavers. For present purposes, however, insurance savings are not taken into account.

FIG. 10 provides a summary of the estimated per-mile costs for a long-haul truck that implements the features described above.

As can be seen above, the cost of operating autonomous, LNG-fueled long-haul freight vehicles could be roughly one-third of the current $1.51 per mile cost reported by ATRI survey respondents.

The present disclosure also contemplates the use of electricity for an energy source in the transportation systems disclosed herein, whether as a sole energy source or as one of a plurality of energy sources (e.g. in a hybrid vehicle). Vehicles that utilize electric power alone have three major benefits over diesel or natural gas-powered (conventional) vehicles. First, the useful life of electric vehicles is growing rapidly due to improvements in battery longevity and the need for fewer moving parts (which tend to wear out more quickly than stationary parts) in electric vehicles. This increase in useful life reduces the depreciation of the vehicle, allowing users to extract more value from electric vehicles than conventional vehicles. For example, the Tesla Semi, announced Nov. 16, 2017, carries a warranty of one million miles and offers a range of 500 miles (https://www.wsj.com/articles/tesla-changes-the-subject-1510940723). Second, electric vehicles are cheaper to maintain, because electric motors do not need oil changes or tune-ups and are less likely to need unexpected repairs. Electric vehicles also do not have complex transmissions, which are a costly element in conventional vehicles. For example, GM's Chevy Bolt pure electric vehicle's first major service (changing the battery cooling fluid), other than replacing cabin air filters and rotating tires, occurs at 150,000 miles (https://www.cnet.com/roadshow/news/chevy-bolt-maintenance-schedule/). Third, electric vehicles have a significantly lower fuel-cost per mile than conventional vehicles, and a significantly more stable fuel-cost per mile, given the volatility of gasoline and diesel prices. Embodiments of the present disclosure that are powered by electricity enjoy these benefits.

Figure 2:
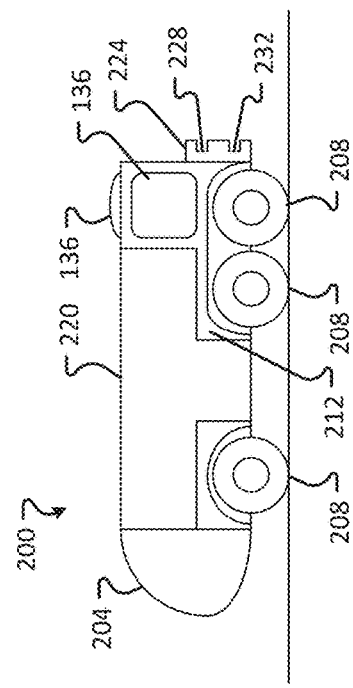
FIG. 2 shows a tractor or REDBPT according to at least one embodiment of the present disclosure.

Turning to the Reversible Electric Driverless Battery Pack Tractors and with reference to FIGS. 1-2, a "Rig" would typically consist of a specially-designed long-haul freight trailer ("Trailer") 100 with a REDBPT 200 attached to one or both ends of the Trailer 100 (e.g. one REDBPT 200 in a pushing configuration and/or one REDBPT 200 in a pulling configuration).

A Trailer 100 according to some embodiments of the present disclosure comprises a freight container 104 supported by wheels 108 and 116. One or more motors 112 or other propulsion devices are operably connected to the wheels 108, and an energy source 120 provides stored energy to the one or more motors 112. Two docking ports 124, one at each end of the Trailer 100, are provided, with each docking port 124 comprising a communications link 128 and an electrical link 132. A plurality of sensors 136 are positioned around the Trailer 100, and a processing unit 140 is also provided.

The freight container 104 may be configured to carry passengers. In such embodiments, the freight container 104 may be equipped, for example, with one or more doors, windows, air vents, emergency exits, lavatories, seats, seat belts, sleeping compartments, dining facilities, and/or bars. As may be appreciated, a Trailer 100 comprising a freight container 104 configured to carry passengers is not limited in appearance or construction to the appearance or construction of trailers used in traditional tractor-trailers used today.

The freight container 104 may alternatively be configured to carry livestock or other live, non-human cargo (and thus may be equipped, for example, with stalls, food/water delivery systems, and windows and/or an HVAC system), and/or inanimate freight (e.g. packages, pallets). The structural design and weight of the freight container 104 may be determined based on the intended use of the Trailer 100 in light of applicable laws regarding, for example, gross vehicle weight restrictions, weight per wheel restrictions, and safety requirements. The length of a freight container 104 of a Trailer 100 may vary, depending on the intended use thereof.

While the wheels 116 are standard, non-powered, non-steerable wheels, the wheels 108 are powered, steerable wheels. While the side view of FIG. 1 shows the powered, steerable wheels 108 on two axles, in some embodiments a Trailer 100 may comprise only a single axle of powered, steerable wheels 108, and in other embodiments the Trailer 100 may comprise more than two axles of powered, steerable wheels 108. Moreover, in some embodiments all of the wheels on a Trailer 100 may be powered, steerable wheels 108. The powered, steerable wheels 108 enable the Trailer 100 to drive independently, in at least some circumstances, of a REDBPT 200 or other tractor. In at least some embodiments, the powered, steerable wheels 108 beneficially provide greater stability and safety when driving under difficult weather and road conditions.

One or more motors 112 or other devices for converting stored chemical or electrical energy into mechanical energy are provided in force-transmitting communication with the powered, steerable wheels 108, both for causing the wheels 108 to rotate around their respective axles and for steering the wheels 108. As discussed above, in some embodiments the Trailer 100 may comprise one or more motors 112 equipped to run on LNG, while in other embodiments the Trailer 100 may comprise one or more motors 112 equipped to run on electricity. In some embodiments, the Trailer 100 may comprise one or more motors 112 configured to run on LNG and one or more motors 112 configured to run on electricity. In such embodiments, the one or more motors 112 configured to run on LNG may drive the powered, steerable wheels 108, while the one or more motors 112 configured to run on electricity may be used for steering the powered, steerable wheels 108. Alternatively, the one or more motors 112 configured to run on LNG may be used to drive a generator for generating electricity, which electricity may be stored in the energy source 120 and/or used to drive the one or more motors 112 configured to run on electricity. Other forms of potential energy besides LNG and electricity may also be used by the one or more motors 112 to generate mechanical energy.

The one or more motors 112 may be configured to drive the wheels 108 in forward or reverse. Particularly in embodiments of the present disclosure where the one or more motors 112 are electric motors, the one or more motors 112 may be equally or nearly equally capable when operating in reverse as they are when operating in forward.

An energy source 120 is also provided on the Trailer 100, for providing fuel or electricity, as appropriate, to the one or more motors 112. The energy source 120 may be, for example, a battery or a fuel cell. The energy source 120 may also be, for example, a container for storing LNG or another fuel useable by the motors 112. In embodiments where the energy source 120 stores LNG, the energy source 120 may also comprise a battery or fuel cell (or a battery or fuel cell may be provided separately from the energy source 120) for powering one or more electrical devices on the Trailer 100, such as operating lights, the sensors 136, and/or the processing unit 140. Additionally or alternatively, embodiments of the present disclosure configured to utilize LNG as an energy source may comprise a generator and/or an alternator for generating electricity to power and/or re-charge electrical systems on the Trailer 100.

The energy source 120 may be built onto or into the Trailer 100, or removably secured to the Trailer 100. In embodiments where the energy source 120 is removably secured to the Trailer 100, the energy source 120, when depleted, can be quickly exchanged with a fresh energy source 120. For example, if the energy source 120 is a battery, then a depleted battery may be removed from the Trailer 100 and a fresh battery attached to the Trailer 100, after which the depleted battery can be charged without causing the Trailer 100 to be out of service during the charging time. Notwithstanding the foregoing, in some embodiments the energy source 120 may be replenishable while the energy source 120 is secured to the Trailer 100. For example, where the energy source 120 is a LNG tank, the tank may be refueled without being removed from the Trailer 100. Similarly, where the energy source 120 is a battery, the battery may be recharged without being removed from the Trailer 100. In some embodiments where the energy source 120 is a battery, the battery may be rechargeable through a regenerative braking system used with the wheels 108 and/or the wheels 116 of the Trailer 100, or from a REDBPT 200 or other tractor attached to the Trailer 100, or from an external source that is connected either directly to the energy source 120 itself or to a docking port 124 of the Trailer 100.

The Trailer 100 of FIG. 1 comprises two docking ports 124, one on each end, for coupling the Trailer 100 with one or more REDBPTs 200 or other tractors, or with one or more additional Trailers 100. Each docking port 124 is a load-bearing mating coupling. In some embodiments, a Trailer 100 may comprise only one docking port 124. The docking port 124 comprises a communication link 128 and an electrical link 132. The communication link 128 enables the Trailer 100 to send data to and receive data from a connected REDBPT 200 or Trailer 100. Such data may include, for example, commands for controlling the powered, steerable wheels 108; commands for operating brakes on the wheels 108 and/or the wheels 116; data received from sensors 136 on the Trailer 100 or on a connected REDBPT 200 or Trailer 100; GPS data or other data regarding a location of the Trailer 100 and a connected REDBPT 200 or other tractor, or Trailer 100; data regarding the amount of fuel or electricity remaining in the energy source 120 or in an energy source of a connected REDBPT 200 or other tractor; and data regarding an upcoming REDBPT 200 exchange. The electrical link 132 enables the Trailer 100 to provide electricity to, or receive electricity from, a connected REDBPT 200 or other tractor, or Trailer 100. In embodiments where the one or more motors 112 are electric motors and the energy source 120 is a battery, the electrical link 132 may be utilized to recharge the battery. In embodiments where the one or more motors 112 are LNG-powered motors, and the energy source 120 is an LNG tank, the electrical link 132 may provide electricity for operating one or more lights and/or other electrical devices on the Trailer 100. In some embodiments of the Trailer 100, the one or more docking ports 124 may comprise only a communication link 128, or only an electrical link 132, or only a load-bearing coupling. Also in some embodiments, the docking port 124 may comprise a single link that provides the functionality of both the communication link 128 and the electrical link 132.

The docking ports 124 are configured to permit autonomous, in-motion docking and undocking. In some embodiments, the docking ports 124 may comprise one or more electromagnets that may be engaged for docking purposes and disengaged for undocking purposes. In other embodiments, the docking ports 124 may comprise one or more hooks movable between an "engage" position and a "release" position. Any fastening mechanism or device that can withstand the conditions to which a Trailer 100 will be subjected and that can safely secure a Trailer 100 to a REDBPT 200 or other tractor may be used for the docking ports 124. Additionally, in some embodiments the docking ports 124 may comprise one or more cameras or other sensors configured to gather information useful by the processing unit 140 and/or by the autonomous driving system 204 of the REDBPT 200 to enable the Trailer 100 and/or the REDBPT 200 to autonomously align their respective docking ports 124, 224.

The sensors 136 of the Trailer 100 are located in and/or around the freight container 104 of the Trailer 100 (and, in some embodiments, on or near the wheels 108 and/or 116, the one or more motors 112, and/or the energy source 120). The sensors 136 may comprise any sensors useful for monitoring the status, the environment, and/or the operating parameters of the Trailer 100. For example, the sensors 136 may comprise RADAR, LiDAR, infrared, optical, and/or ultrasonic sensors. As further examples, the sensors 136 may comprise accelerometers, odometers, tachometers, GPS and/or other position/location sensors. The sensors 136 convert sensed information into electrical data, which is then provided to the processing unit 140 of the Trailer 100 or of the REDBPT 200 (via the communication link 128).

The processing unit 140 of the Trailer 100 comprises a processor and a memory. The processing unit 140 receives data from the sensors 136 and, in some embodiments, via the communication link 128. The received data may be stored in the memory, which memory also contains instructions for execution by the processor. The instructions stored in the memory, when executed by the processor, cause the processor to analyze the received data and, where appropriate, generate and transmit commands and/or other signals. For example, in some embodiments the processor 140 may generate driving commands and then transmit the driving commands to the one or more motors 112 and/or to the powered, steerable wheels 108, so as to cause the Trailer 100 to travel in a desired path (e.g., along a route selected by the processing unit 140 to a destination). In other embodiments, the processor 140 may determine, based on data received from the sensors 136, that a collision with another vehicle or other object is imminent, and may therefore generate and send one or more signals to activate brakes on the wheels 108 and/or the wheels 116.

In some embodiments, the processing unit 140 of the Trailer 100 may comprise a wireless communication transceiver for sending and receiving information wirelessly. For example, the processing unit 140 may communicate wirelessly with the plurality of sensors 136, with one or more REDBPTs 200 (e.g., during a REDBPT Swap-Out maneuver), and with the Internet (whether to receive instructions from an owner or operator of the Trailer 100, or to obtain information about traffic, weather, road conditions, or preferred routes, as examples). The wireless communication transceiver may be used, for example, to connect the Trailer 100 to the Waze app or to any other app or service that provides information useful to navigation or operation of the Trailer 100.

As indicated above, the Trailer 100 is capable of independent (e.g. without connection to a REDBPT 200 or other tractor) locomotion and steering. However, in some embodiments, the energy source 120 of the Trailer 100 does not enable the Trailer 100 to operate independently of a REDBPT 200 for an extended period of time. As a result, the Trailer 100 is advantageously connected to one or two REDBPTs for long-haul operations. The ability of the Trailer 100 to operate independently of a REDBPT, though, facilitates the REDBPT exchange process, as described in greater detail below.

A REDBPT 200 according to embodiments of the present disclosure is a tractor that comprises an autonomous driving system 204, a plurality of powered, steerable wheels 208, one or more motors 212 or other propulsion device(s), an energy source 220, a docking port 224 with a communication link 228 and an electrical link 232, and a plurality of sensors 136.

The autonomous driving system 204 may comprise, for example, a processor, a memory, one or more wireless communication transceivers, and one or more wired communication transceivers. The autonomous driving system 204 receives information from the plurality of sensors 136 on the REDBPT 200 and/or on a connected Trailer 100 via the one or more wireless communication transceivers and/or the one or more wired communication transceivers. Executing instructions stored in the memory, the processor analyzes the received information, makes operating decisions for the REDBPT 200 (and, in some embodiments, for the Trailer 100), generates corresponding commands, and transmits the commands to the one or more motors 212, and/or to the plurality of powered, steerable wheels 208. Also, in some embodiments the autonomous driving system 204 of a REDBPT 200 may be configured to control the Trailer 100, by sending instructions to the Trailer 100 wirelessly or via the docking ports 224, 124 for controlling, for example, the one or more motors 112, the powered, steerable wheels 108, brakes on the wheels 108 and 116, and/or the processing unit 140. A REDBPT 200 may control the acceleration, braking, and/or steering of a Trailer 100, for example, for as long as the REDBPT 200 is docked to the Trailer 100, or (if the REDBPT 200 and the Trailer 100 are equipped with wireless transceivers or other means of wireless communication) from start to finish of a REDBPT Swap-Out process, or for a portion of a REDBPT Swap-Out process.

In addition to storing instructions for execution by the processor, the memory of the autonomous driving system 204 may also store one or more navigation databases, which the processor of the autonomous driving system 204 may access to select one or more routes for reaching a particular destination. The destination may be, for example, a REDBPT Charging and Dispatch Facility, or a delivery point for the contents of the Trailer 100. Information about the delivery point for the contents of the Trailer 100 may be provided to the autonomous driving system 204 by the processing unit 140 of the Trailer 100 via the docking ports 124/224, or wirelessly via wireless communication transceivers, or from an owner or operator of the REDBPT 200 and/or of the Trailer 100 via a wireless connection with the Internet).

The autonomous driving system 204 may also receive relevant information from external sources via the wireless communication transceiver. For example, the autonomous driving system 204 may receive information about traffic, weather, and/or road conditions via the wireless communication transceiver and may use such information when selecting a route using the one or more stored navigation databases. Further, the autonomous driving system 204 may be configured to select, for example, the most energy efficient route (which may be the route with the least change in elevation, or the route with the shortest distance, or the route that has the fewest stop signs/stoplights), the shortest route, the fastest route, the cheapest route (considering, for example, energy usage and tolls), or the route that passes the most REDBPT Charging and Dispatch Facilities.

Although the autonomous driving system 204 is depicted in FIG. 2 as being located on a front end of the REDBPT 200, the autonomous driving system 204 may be located elsewhere on the REDBPT 200.

The REDBPT 200 of FIG. 2 is shown as including a plurality of powered, steerable wheels 208. REDBPTs 200 according to other embodiments of the disclosure may have more or fewer powered, steerable wheels. In some embodiments, the front wheels of the REDBPT 200 (e.g., the wheels closest to the autonomous driving system 204) may be steerable but not powered, or vice versa. Similarly, the rear wheels of the REDBPT 200 maybe powered but not steerable. Any combination of powered wheels, steerable wheels, powered and steerable wheels, and unpowered and unst201eerable wheels may be used, provided that the REDBPT 200 is able to maneuver (whether alone or with a connected Trailer 100) on existing road systems.

The REDBPT 200 also comprises one or more motors 212 or other propulsion device(s). Like the motors 112, the one or more motors 212 may be configured to burn LNG, or to be driven by electricity, or to convert another form or source of potential energy into mechanical energy. In some embodiments, the REDBPT 200 may have a hybrid configuration, with at least one motor 212 configured to burn LNG or another fuel (e.g., compressed natural gas, diesel) to generate electricity, and at least one electric motor 212 configured to drive the powered, steerable wheels 208 of the REDBPT 200. Also in some embodiments, the REDBPT 200 comprises one motor 212 per powered, steerable wheel 208, while in other embodiments, one or more of the motors 212 of the REDBPT 200 are configured to drive a plurality of wheels 208.

Each REDBPT 200, as well as the Trailer 100, is capable of traveling in a forward or reverse direction, with little or no distinction or difference in performance. Particularly when the REDBPTs 200 are powered by electric motors 212, the primary difference between forward and reverse travel is the polarity of the charge applied to the electric motors 212.

The REDBPT 200 comprises an energy source 220, which may be a tank for storing LNG, a battery for storing electrical energy, a fuel cell, or another energy source. The energy stored in the energy source 220 is provided to the one or more motors 212 for operation thereof. In some embodiments, the energy source 220 is configured to store twice as much energy, or five times more energy, or as much as ten times more energy (or more) than the energy source 120 of the Trailer 100. Also in some embodiments, the energy source 220 is removably secured to the REDBPT 200, such that the energy source 220, when depleted, can be quickly exchanged for a full or charged energy source 220 by removing the depleted energy source 220 and securing a full or charged energy source 220 onto the REDBPT 200. In other embodiments, the energy source 220 is built onto or into the REDBPT 200 or is not intended for routine removal from the REDBPT 200. Regardless of whether the energy source 220 is removably secured to the REDBPT 200 or not, the energy source 220 may be recharged or otherwise replenished while secured to the REDBPT 200.

The docking port 224 of the REDBPT 200 is substantially similar to the docking port 124 of the Trailer 100, except that the docking port 224 comprises a female communication link 228 and electrical link 232, while the docking port 124 comprises a male communication link 128 and electrical link 132. In other embodiments of the present disclosure, the docking port 224 may comprise male connectors and the docking port 124 may comprise female connectors, or each docking port 124, 224 may have a mix of male and female connectors, or the connectors may utilize a connection system other than a male/female connection system.

The REDBPT 200 also comprises a plurality of sensors 136, which are described above in connection with the Trailer 100. The sensors 136 provide information to the autonomous driving system 204 necessary to enable the autonomous driving system 204 to safely (e.g., without damage, injury, or other harm to the REDBPT 200 or to persons, property, or objects external to the REDBPT 200) navigate a course.

A "Rig," as that term is used herein, comprises at least one Trailer 100 and at least one REDBPT 200. In some embodiments of the present disclosure, a Trailer 100 may self-navigate on short trips (e.g., with no REDBPT 200 coupled thereto), but for other trips one or two REDBPTs 200 couple to the Trailer 100 to form a Rig that travels along roads, highways, streets, or other suitable pathways. Although not explicitly shown in the Figures, a Rig may comprise a plurality of Trailers 100 docked to each other, with one or more REDBPTs 200 docked to the front of the plurality of Trailers 100, the rear of the plurality of Trailers 100, and/or in between the plurality of Trailers 100. REDBPTs 200 configured to dock in between two Trailers 100 comprise front and rear docking ports 224. In some embodiments, a plurality of REDBPTs 200 may dock to each other, which plurality of REDBPTs 200 may also be docked to one or more Trailers 100.

Persons of ordinary skill in the art will recognize, based on the foregoing disclosure, that the Trailer 100 and/or the REDBPT 200 may comprise any external shape that is suitable for travel over roads and highways, and that the foregoing disclosure is intended to describe various components of the Trailer 100 and/or the REDBPT 200, respectively, without limiting the form or shape of those components.

Figures 3, 4, 5:
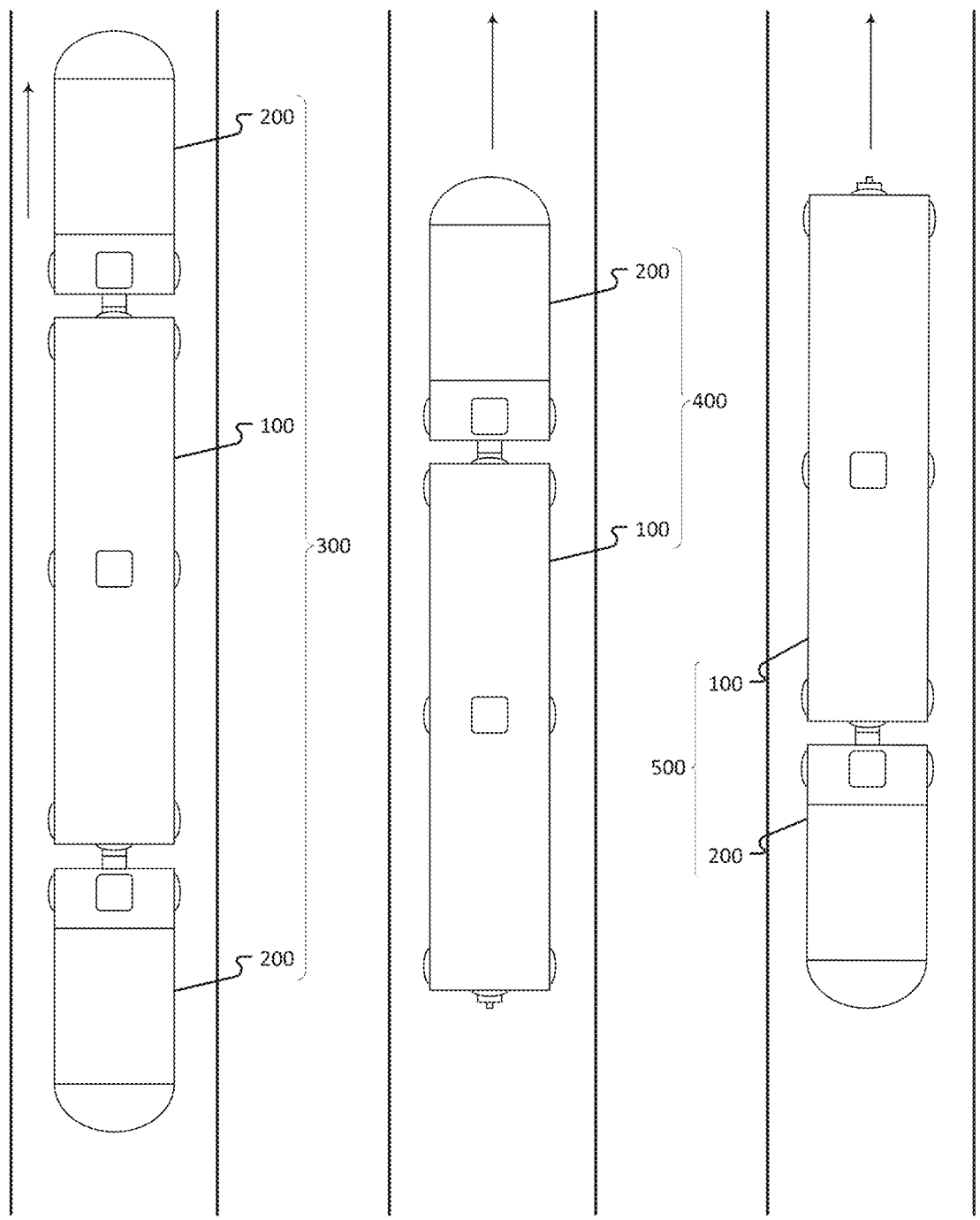
FIG. 3 shows a top plan view of a Trailer operably connected to two tractors or REDBPTs according to at least one embodiment of the present disclosure.
FIG. 4 shows a top plan view of a Trailer operably connected to one tractor or REDBPT in a pull configuration, according to at least one embodiment of the present disclosure.
FIG. 5 shows a top plan view of a Trailer operably connected to one tractor or REDBPT in a push configuration, according to at least one embodiment of the present disclosure.

FIGS. 3-5 depict several possible configurations of a Rig comprising a Trailer 100 and at least one REDBPT 200. FIG. 3 shows a Rig 300 in which a single Trailer 100 is connected to two REDBPTs 200, one configured to pull the Trailer 100 and the other configured to push the Trailer 100. The use of two REDBPTs 200 with a single Trailer 100 may be desirable, for example, when the weight of the Trailer 100 is particularly high, and/or when the course to be traveled is longer than can be made by a single REDBPT 200 (based on the amount of energy storable in the energy source 220 of the REDBPT 200) and will not permit an exchange of REDBPTs 200 at a suitable point along the course (e.g., at the point where the energy source 220 of a single REDBPT 200 would be depleted), and/or when there is a wide range in the predicted travel time (whether due to traffic, weather, road conditions (including, for example, road construction), or other factors) and a single REDBPT 200 will not have enough stored energy to complete the course if the travel time is at the higher end of the predicted range. In some embodiments, the configuration of the Rig 300 may occur only briefly, such as after a fresh REDBPT 200 (e.g., a REDBPT 200 with replenished energy source 220) attaches to the Trailer 100 and before a depleted REDBPT 200 (e.g., a REDBPT 200 with a depleted energy source 220) detaches from the Trailer 100.

FIG. 4 shows a Rig 400 comprising a single REDBPT 200 pulling a single Trailer 100. FIG. 5 shows a Rig 500 comprising a single REDBPT 200 pushing a single Trailer 100. The Rigs 400 and 500 may be used for any trip where a single REDBPT 200 will have sufficient power to move the Trailer 100 along a desired course, and where the entire trip may be accomplished using the energy stored in a single REDBPT 200 or, alternatively, where one or more fresh REDBPTs 200 will be available along the course for exchanging places with a depleted REDBPT 200. In some embodiments, a Rig may begin a trip in the configuration of the Rig 400, but end the trip in the configuration of the Rig 500 due to a mid-trip, non-stop exchange of a depleted REDBPT 200 for a replenished REDBPT 200.

Figure 6A:
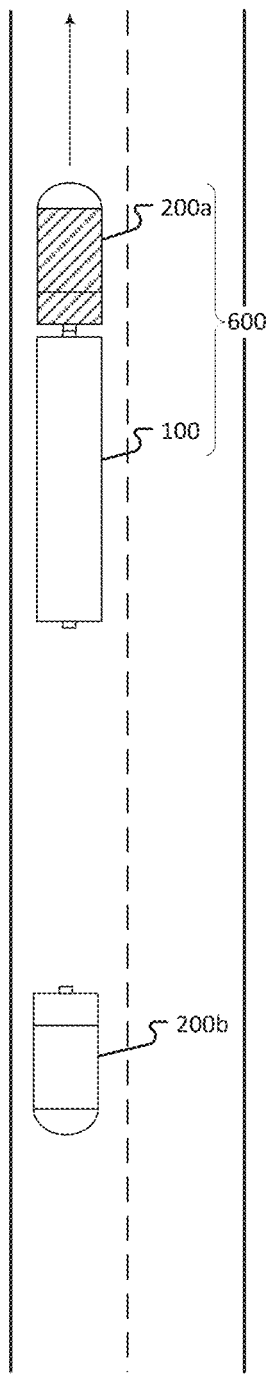
FIG. 6A shows a first step of a REDBPT Swap-Out according to at least one embodiment of the present disclosure.
Figure 6B:
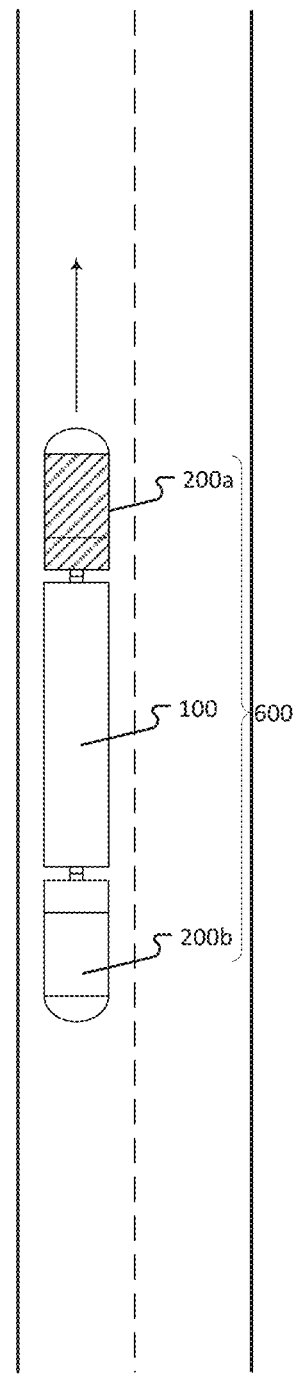
FIG. 6B shows a second step of the REDBPT Swap-Out of FIG. 6A.
Figure 6C:
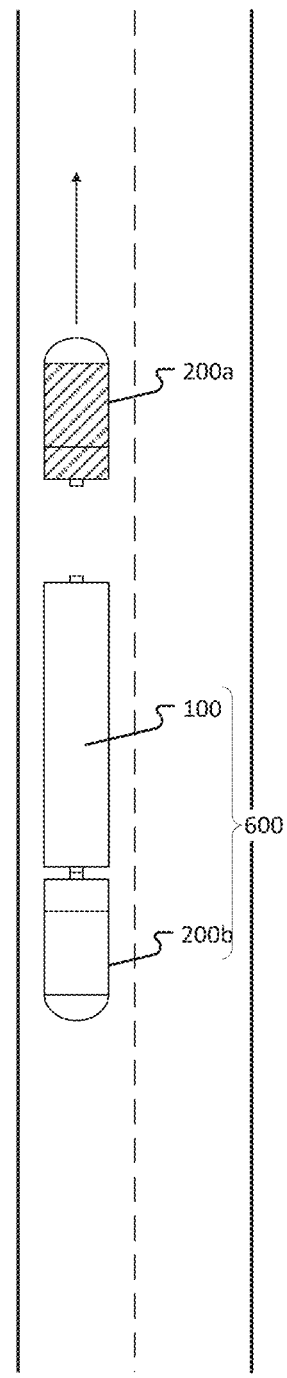
FIG. 6C shows a third step of the REDBPT Swap-Out of FIG. 6A.

The process of accomplishing such an exchange (a "Swap-Out") is illustrated in FIGS. 6A-6C. When the battery or other energy source 220 of the REDBPT 200a of a Rig 600 approaches empty, or when the Rig 600 approaches a predetermined Swap-Out location (e.g., a predetermined section of road), the Rig 600 may be met (while underway on the road) by a replenished replacement REDBPT 200b. In some embodiments, the replenished REDBPT 200b may approach the Trailer 100 from behind (FIG. 6A), under the control of the autonomous driving system 204 of the REDBPT 200b or, in some embodiments, under the control of the REDBPT 200a. The REDBPT 200b then docks with the Trailer 100 while the exhausted REDBPT 200a is still docked to the front end of the Trailer 100 (FIG. 6B). Once the replenished REDBPT 200b is docked with the trailer 100, a corresponding signal may be sent (either wirelessly or via the Trailer 100) to the autonomous driving system 204 of the exhausted REDBPT 200a. Upon receipt of the corresponding signal indicating that the replenished REDBPT 200b has docked with the Trailer 100, the processor of the autonomous driving system 204 of the exhausted REDBPT 200a may execute instructions stored in a memory of the autonomous driving system 204 that cause the exhausted REDBPT 200a to detach, undock, or otherwise disconnect from the Trailer 100 (FIG. 6C).

After Swap-Out, the near-empty REDBPT 200a may navigate itself (under control of the autonomous driving system 204 of the REDBPT 200a) to a nearby Charging and Dispatch Facility, which may be the same facility from which the fresh REDBPT 200b used in the Swap-Out originated. The REDBPT 200a would then be recharged or refueled as appropriate, run through a thorough automated safety check, and made ready for its next "assignment." Minor repairs and maintenance services might also be performed at the Charging and Dispatch Facility. In some embodiments, a REDBPT 200 is managed by dispatching software that ensures the REDBPT 200 always has a sufficient remaining charge to get to a nearby Charging and Dispatch Facility. These facilities could be located anywhere along the usual routes of the Rigs. The dispatching software may be loaded into the processor of the autonomous driving system 204 of the REDBPT 200, or the dispatching software may utilize wireless communications with the autonomous driving system 204 via one or more wireless transceivers to obtain information from and provide information and/or instructions to the REDBPT 200.

Figures 7A, 7B, 7C:
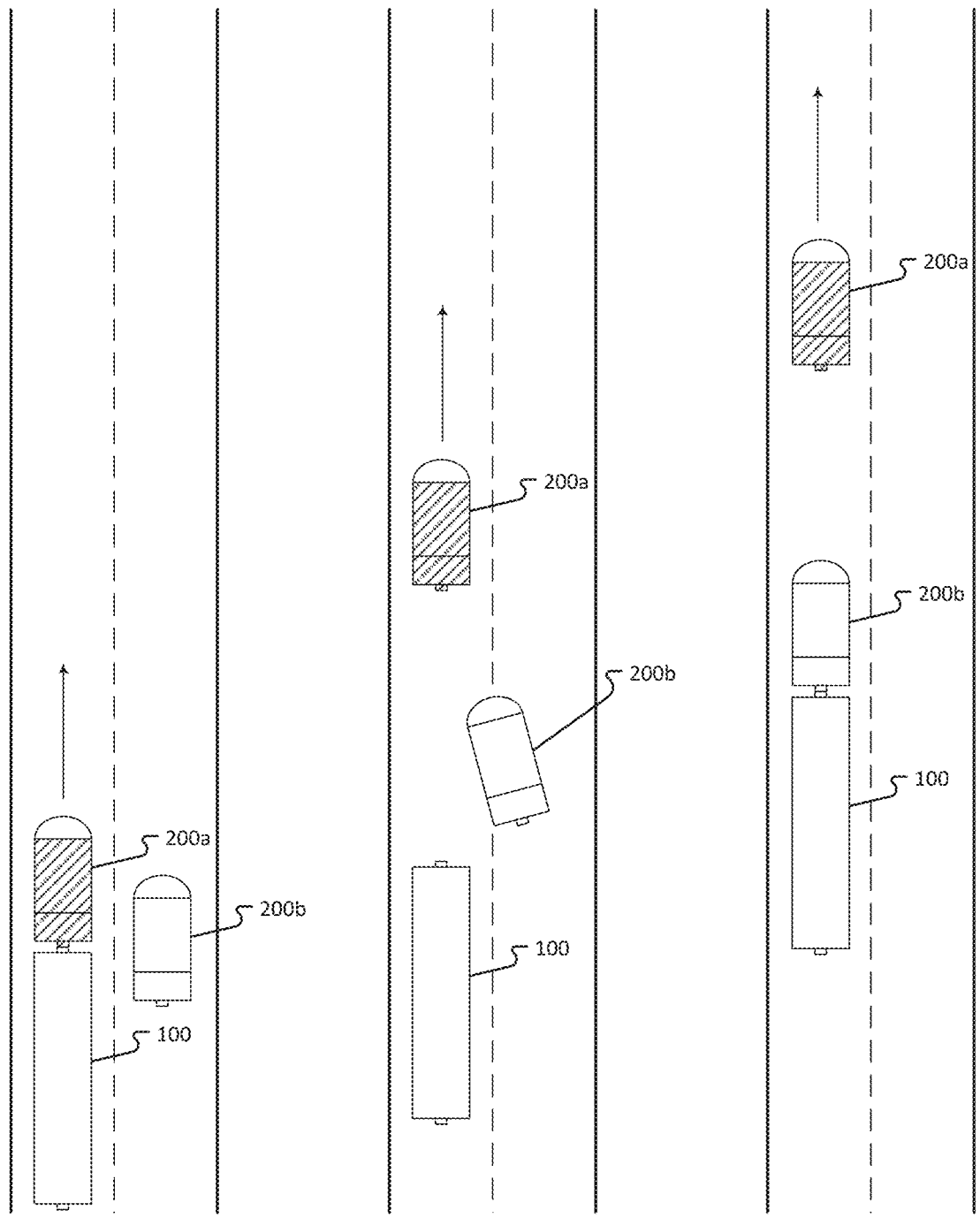
FIG. 7A shows a first step of a REDBPT Swap-Out according to at least another embodiment of the present disclosure.
FIG. 7B shows a second step of the REDBPT Swap-Out of FIG. 7A.
FIG. 7C shows a third step of the REDBPT Swap-Out of FIG. 7A.

In another embodiment of the present disclosure, illustrated in FIGS. 7A-7C, the original Rig configuration is maintained before and after the Swap-Out maneuver. In this embodiment, the fresh REDBPT 200b pulls alongside the Trailer 100 and the depleted REDBPT 200a (FIG. 7A). Upon arrival of the REDBPT 200b, the REDBPT 200a decouples itself from the Trailer 100 and distances itself from the Trailer 100, thus permitting the fresh REDBPT 200b to maneuver in front of the Trailer 100 (FIG. 7B). The decoupling of the REDBPT 200a from the Trailer 100 may result, for example, from the execution of instructions stored in a memory of the autonomous driving system 204 of the REDBPT 200a by a processor of the autonomous driving system 204 of the REDBPT 200a. The fresh REDBPT 200b then docks with the Trailer 100 (under the control of the autonomous driving system 204 of the REDBPT 200*b*, the processor of which executes instructions stored in a connected memory to accomplish the docking), thus completing the Swap-Out maneuver. As described above, the depleted REDBPT 200*a* navigates itself to a REDBPT charging station where it can be replenished and made available for a Swap-Out with another Rig.

The Swap-Out process of FIGS. 7A-7C is possible because the Trailer 100 comprises powered, steerable wheels 108, one or more motors 112, an energy source 120, and a processing unit 140—or, in short, because the Trailer 100 is capable of independent autonomous navigation (whether temporary or not). During the period when no REDBPT 200 is docked with the Trailer 100—which period may occur when the Trailer 100 is in motion—the Trailer 100 autonomously maintains its speed and course. In some embodiments, including the embodiments illustrated in FIGS. 6A-8C, the Swap-Out process may occur when the REDBPT 200 and Trailer 100 are traveling along a freeway, at speeds ranging from 5 to 85 mph, or from 30 to 80 mph, or from 55 to 80 mph, or from 60 to 70 mph. In some embodiments, one or more of the REDBPTs 200 participating in the Swap-Out process may send signals to and receive signals from the Trailer 100 (using, for example, radio links between wireless communication transceivers of the processing unit 140 of the Trailer 100 and the autonomous driving system 204 of the REDBPT 200), which signals may comprise information and/or commands that facilitate electronic coordination of the movements of the Trailer 100 and of the REDBPT(s) 200 and thus enable docking without stopping or otherwise interrupting the progress of the Rig.

Figure 8A:
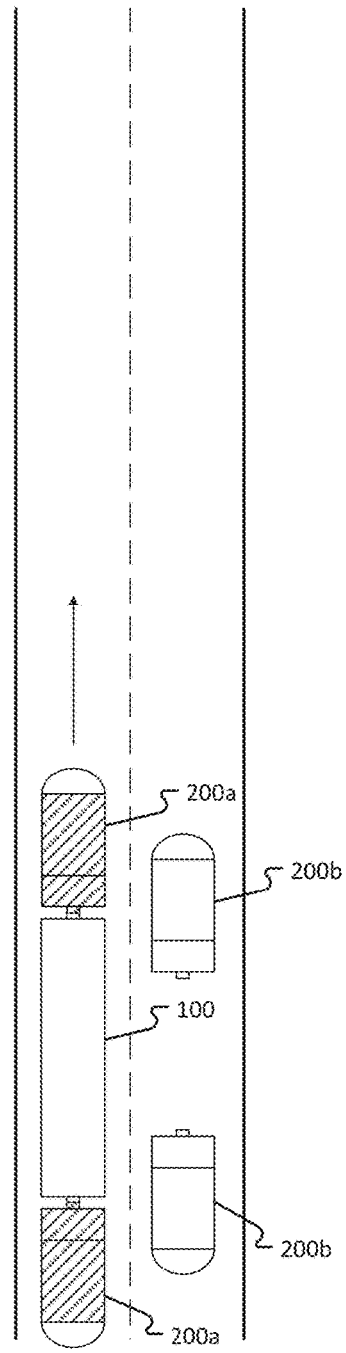
FIG. 8A shows a first step of a REDBPT Swap-Out according to at least a further embodiment of the present disclosure.
Figure 8B:
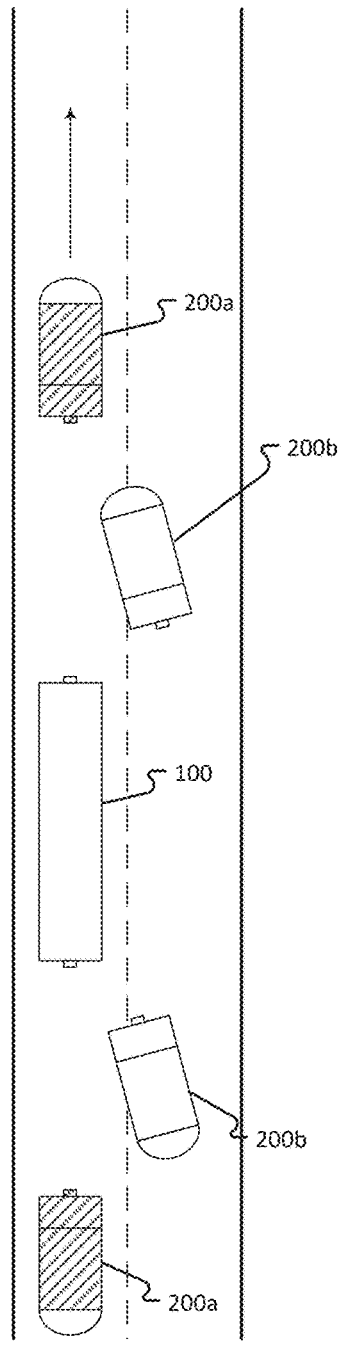
FIG. 8B shows a second step of the REDBPT Swap-Out of FIG. 8A.
Figure 8C:
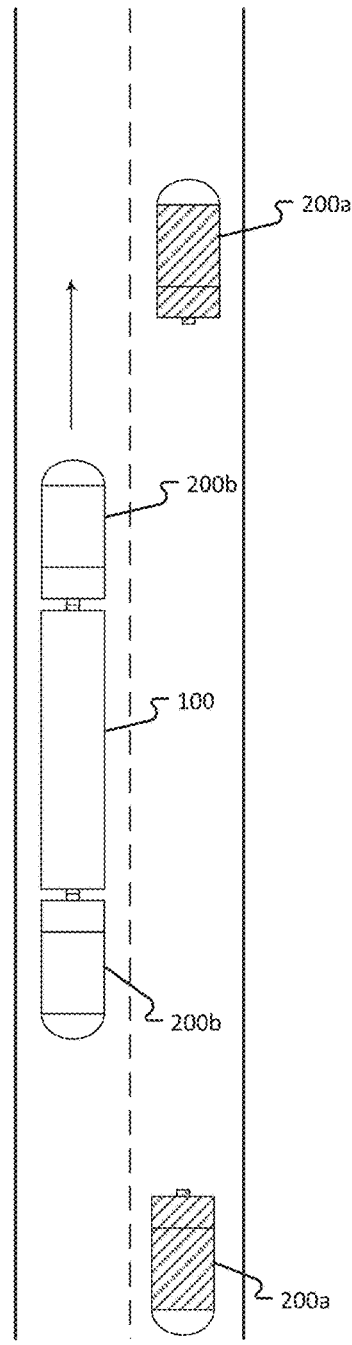
FIG. 8C shows a third step of the REDBPT Swap-Out of FIG. 8A.

FIGS. 8A-8C illustrate a third Swap-Out process involving a Rig comprising one Trailer 100 and two REDBPTs 200*a* docked thereto (one in a pushing configuration and one in a pulling configuration). The process begins with the fresh REDBPTs 200*b* pulling alongside the Trailer 100 and the exhausted REDBPTs 200*a* (FIG. 8A). The REDBPTs 200*a* then undock from the Trailer 100 and maneuver to distance themselves from the Trailer 100, thus allowing the fresh REDBPTs 200*b* to maneuver immediately in front of and behind the Trailer 100, respectively (FIG. 8B). Finally, the fresh REDBPTs 200*b* dock with the Trailer 100, and the exhausted REDBPTs 200*a* begin navigation to a REDBPT charging station (FIG. 8C).

While FIGS. 8A-8C show the Swap-Out process happening simultaneously for the REDBPTs 200 in front of and behind the Trailer 100 (which requires that the Trailer 100 navigate autonomously while it is undocked from any REDBPT 200), in other embodiments the Swap-Out process happens sequentially. For example, the front REDBPT 200*a* may undock from and then distance itself from the Trailer 100, after which the front REDBPT 200*b* may maneuver in front of the Trailer 100 and dock with the Trailer 100. This process would then be repeated for the rear REDBPTs 200*a* and 200*b*.

When a Rig nears the end of a given trip and approaches the destination of the Trailer 100, the one or more REDBPTs 200 attached to the Trailer 100 may undock and return to a Charging and Dispatch Facility, while the Trailer 100 may independently navigate itself to its destination. Trailers 100 may be capable of independently driving themselves within freight distribution and Trailer repair facilities for loading, unloading, or services. Alternatively, the one or more REDBPTs 200 attached to the Trailer 100 may remain docked to the Trailer 100 until reaching the destination of the Trailer 100.

If, while a Rig is en route, one or both of the Trailer 100 and a docked REDBPT 200 determine that a collision (e.g. with another vehicle on the road, or with a foreign object on the road) is imminent, the Trailer 100 and any docked REDBPTs 200 may uncouple (whether by the Trailer 100 decoupling from any docked REDBPTs 200, or by the docked REDBPT(s) 200 decoupling from the Trailer 100, or by the Trailer 100 and any docked REDBPTs 200 decoupling simultaneously), and the Trailer 100 (whether acting independently or under remote control of one or more REDBPTs 200) and/or the REDBPT(s) 200 may brake and/or steer off the road to minimize the chance of injury to humans (e.g. by avoiding a collision with another vehicle).

In some embodiments, Rigs according to embodiments of the present disclosure may be configured to drive in close formation to achieve corresponding aerodynamic benefits. In such embodiments, the REDBPTs 200 of each Rig may be configured to communicate wirelessly with each other to ensure that all of the Rigs accelerate, decelerate, and otherwise navigate in a coordinated fashion. Operation of multiple Rigs in close formation may reduce fuel or energy consumption by as much as ten to fifteen percent. Additional aerodynamic benefits may be achieved by utilizing lightweight carbon-fiber shrouds, shells, or connectors to reduce aerodynamic drag and further improve fuel/energy efficiency and reduce fuel/energy consumption.

The present disclosure also encompasses a dispatch system to manage multiple tractor, trailer, and Rig trips and to ensure that tractors (e.g., REDBPTs 200) are normally replaced with enough remaining charge to reach a Charging and Dispatch Facility; and connectivity to road infrastructure or other sources to receive real-time traffic and road construction updates.

Logistics and Economics: The Rigs described herein, due to their autonomous driving capability, could operate 24 hours a day, 7 days a week, thus maximizing return on investment. They could also be scheduled to avoid travel within metropolitan areas during heavy traffic times, such as morning and evening rush hours. Cities might even wish to encourage off-hour deliveries by charging the equivalent of highway tolls for travel in dynamically geo-fenced areas (such as adjacent to an active sports stadium or city center) during peak times. Such a tolling system could be automatically interfaced with the dispatch software, which could then optimize the most cost-effective and congestion-friendly travel scenarios for the Rigs that interface with the dispatch software. By using a tolling system, the dispatch software could still complete rush deliveries on time, albeit at a premium cost. Thus, travel in congested areas would become a business decision based on prescribed economic penalties or incentives.

Figure 11:
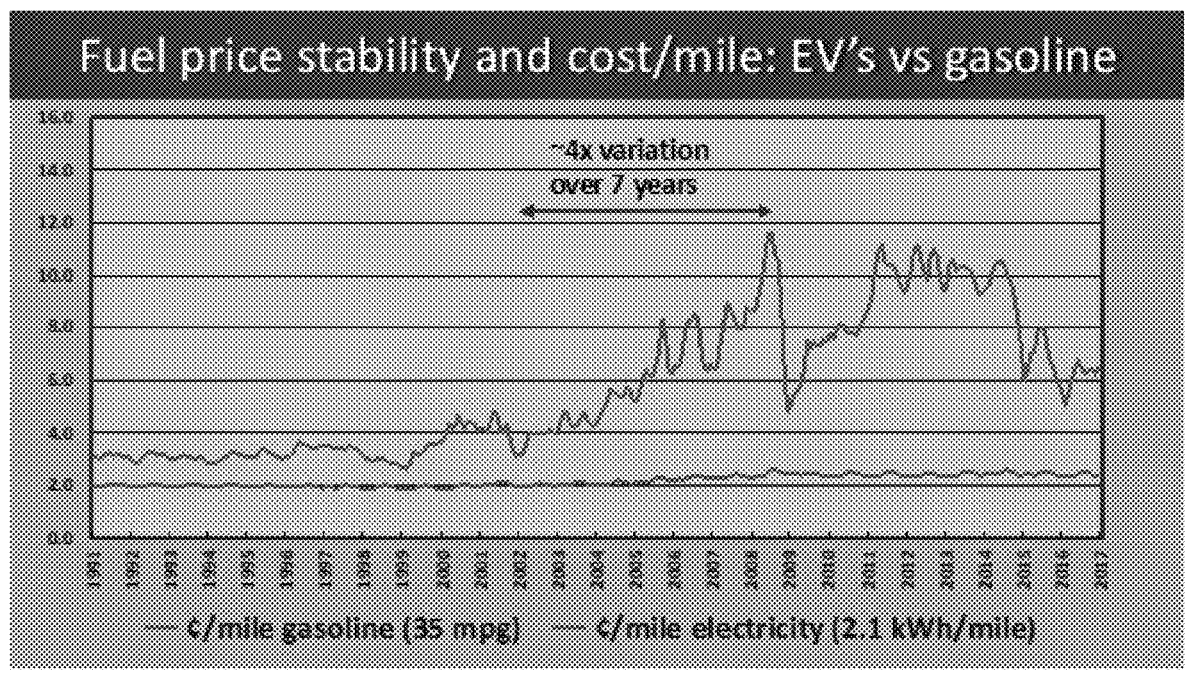
FIG. 11 is a graph comparing fuel price stability and cost per mile for electric vehicles versus gasoline-powered vehicles.

With respect to Rigs as described herein that utilize electricity rather than LNG or another fuel, note that electricity is, historically, not only a much cheaper fuel source than diesel and gasoline, but also has proven over many decades to be very stable in price. By comparison, oil is subject to extreme price fluctuations depending on natural disasters, international conflicts, and geopolitics (see FIG. 11, comparing fuel price stability and cost per mile for electric vehicles versus gasoline-powered vehicles, using data from the U.S. Energy Information Administration and other sources, and with a 1.4 cent per mile highway use tax added to industrial electricity prices).

In most states, REDBPT charging facilities could acquire power from their own low-maintenance solar and/or wind farms. Wind and solar electricity is now far cheaper to produce than coal or even natural gas. In 2017, Xcel Energy received 96 bids for Colorado wind power projects. The median bid was $18.10 per megawatt hour, or 1.81 cents per kilowatt hour. The median bid for 152 solar projects was 2.95 cents per kilowatt hour (https://www.bizj ournals.com/denver/news/2018/01/16/xcel-energy-gets-unprecedented-response-to-power.html). This compares to 2015 average U.S. Industrial rates of 6.91 cents per kilowatt hour (https://www.eia.gov/electricity/annual/html/epa_02_04.html).

However, the greatest challenge faced by solar and wind is their intermittent nature (e.g., they don't operate 24 hours a day/7 days a week). Because of this, utility-scale wind and solar farms often include large and expensive battery backup systems. But if the wind and/or solar farm is co-located with the REDBPT Charging and Dispatch Facility, the REDBPTs effectively serve as battery storage systems for the renewable energy generation facilities, capturing their electricity whenever it is generated and using it to move freight at the lowest possible cost. The facility can also be linked into the nation's electric grid, buying electricity when wind and solar aren't producing and selling surplus power when renewable electricity is plentiful. Some facilities may even choose to further insure against periods of scarce wind or sunshine by including relatively low emission combined cycle natural gas electricity plants, some co-located with natural gas fields. "Wellhead" prices for natural gas averaged 27% lower than Industrial prices between 2000 and 2012 (U.S. Energy Information Administration). Natural gas is not just cheaper but also cleaner than most electricity produced by local utilities. The latest NGCC generators produce about a third as much $CO_2$ as existing coal plants. But most freight could be moved using renewable electricity from wind or sunshine.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7, ABX, A9, A9X, A10, A10X, and A11 processors with 64-bit architecture, Apple® M7, M8, M9, M10, and M11 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARM926EJS™ processors. A processor as disclosed herein may perform computational functions using any known or future-developed standard, instruction set, libraries, and/or architecture.

The invention claimed is:

1. A rig comprising:
   at least one tractor, comprising:
      a first autonomous driving system comprising a first processor and a first plurality of sensors, the first autonomous driving system configured to steer the at least one tractor autonomously;
      a first energy source;
      at least one tractor motor powered by the first energy source; and
      a first docking port comprising a first communication link; and
   at least one trailer, comprising:
      a second autonomous driving system comprising a second processor and a second plurality of sensors, the second autonomous driving system configured to steer the at least one trailer autonomously;
a freight container;
a second energy source;
at least one trailer motor;
a plurality of powered, steerable wheels; and
a second docking port detachably secured to the first docking port, the second docking port comprising a second communication link detachably secured to the first communication link.

2. The rig of claim 1, wherein the first energy source is a first battery, the second energy source is a second battery, the at least one tractor motor is an electric motor, and the at least one trailer motor is an electric motor.

3. The rig of claim 2, wherein the first battery has a greater capacity than the second battery.

4. The rig of claim 2, wherein the at least one tractor motor has substantially equal capabilities when operated in forward and reverse.

5. The rig of claim 1, wherein the first autonomous driving system further comprises a first wireless transceiver.

6. The rig of claim 5, wherein the first autonomous driving system receives information about at least one of traffic and road conditions via the first wireless transceiver.

7. The rig of claim 5, wherein the first autonomous driving system controls at least one of acceleration, braking, and steering of the at least one trailer via the first communication link or the first wireless transceiver.

8. The rig of claim 1, wherein the at least one trailer comprises a regenerative braking system.

9. The rig of claim 1, wherein the second plurality of sensors comprises a radar, a LiDAR, or a camera.

10. The rig of claim 1, wherein the at least one tractor is docked to a rear end of the at least one trailer and is further configured to push the at least one trailer.

11. A tractor-trailer system comprising:
a trailer comprising:
at least one trailer coupling; and
a storage volume; and
a tractor comprising:
a plurality of wheels;
an electric motor operably connected to the plurality of wheels so as to selectively drive the plurality of wheels;
a tractor coupling detachably secured to the at least one trailer coupling; and
an autonomous navigation system comprising:
a first plurality of sensors;
a processor; and
a memory storing instructions for execution by the processor, the instructions, when executed by the processor, causing the processor to selectively detach the tractor coupling from the at least one trailer coupling while the tractor and trailer are in motion.

12. The tractor-trailer system of claim 11, wherein the selective detachment of the tractor coupling from the at least one trailer coupling occurs while the tractor and trailer are traveling between 5 miles per hour and 85 miles per hour.

13. The tractor-trailer system of claim 11, wherein the storage volume comprises a plurality of passenger seats and a lavatory.

14. The tractor-trailer system of claim 11, wherein the trailer further comprises:
a plurality of powered, steerable wheels;
a second plurality of sensors; and
a processing unit capable of autonomously controlling operation of the powered, steerable wheels, based in part on information from the second plurality of sensors.

15. The tractor-trailer system of claim 14, wherein the powered, steerable wheels are powered by at least one electric motor.

16. The tractor-trailer system of claim 11, wherein the tractor further comprises a tractor battery.

17. The tractor-trailer system of claim 16, wherein the trailer further comprises a trailer battery, and wherein a storage capacity of the tractor battery is at least five times greater than the storage capacity of the trailer battery.

18. The tractor-trailer system of claim 11, further comprising a second tractor comprising a second tractor coupling, and wherein the trailer comprises at least a second trailer coupling detachably secured to the second tractor coupling.

19. The tractor-trailer system of claim 11, wherein the memory stores additional instructions for execution by the processor, the additional instructions, when executed by the processor, causing the processor to selectively cause the tractor coupling to attach to the at least one trailer coupling while the tractor and trailer are in motion.

20. A long-haul transport system comprising:
a trailer comprising:
an enclosure for holding passengers or cargo;
a trailer docking port;
a plurality of sensors;
a processing unit capable of autonomously driving the trailer, based in part on information received from the plurality of sensors; and
a plurality of powered, steerable wheels controlled by the processing unit; and
a plurality of autonomous tractors, each autonomous tractor comprising:
a tractor docking port removably attachable to the trailer docking port;
an autonomous driving system;
a second plurality of sensors configured to provide sensed information to the autonomous driving system;
a replaceable battery; and
at least one electric motor powered by the replaceable battery, the at least one electric motor drivingly connected to a plurality of wheels,
wherein each of the plurality of autonomous tractors, under the control of the autonomous driving system, sequentially docks with the trailer via the tractor docking port and the trailer docking port while the trailer is in motion; remains docked with the trailer until reaching a predetermined battery level or geographical location; and undocks from the trailer while the trailer is in motion.

* * * * *